3,313,741
PREPARATION OF STABILIZED POLYMERIZATION CATALYSTS AND THEIR USE
Heinz Uelzmann, Cuyahoga Falls, and David Feld, Akron, Ohio, assignors to The General Tire & Rubber Company, Akron, Ohio, a corporation of Ohio
No Drawing. Filed Sept. 28, 1962, Ser. No. 227,043
8 Claims. (Cl. 260—2)

This invention relates to a method of stabilizing organometallic epoxide polymerization catalysts by forming metal complexes with tertiary amines, ethers or thioethers and reacting the complexes with a cocatalyst containing active hydrogen.

The use of hydrocarbon-substituted metals as catalysts in epoxide polymerization is now well known. These catalytic compounds fall into two categories, one of which includes divalent metals as in diethyl zinc and the other of which includes more polyvalent metals as in triethyl aluminum. It was found that compounds containing active hydrogen were effective cocatalysts with the organometallic compounds. The term "active hydrogen" includes hydrogen attached to oxygen as in water and alcohols, hydrogen attached to sulfur as in hydrogen sulfide and thiols, hydrogen attached to nitrogen as in primary aromatic amines, certain secondary amines and amides, and hydrogen attached to carbon atoms alpha to conjugated double bonds in such compounds as cyclopentadiene and cyclohexadiene.

It was found that certain compounds formed complexes with metals such as aluminum in organometallic compounds and that these complexes besides being stable themselves formed stable products with the cocatalysts containing active hydrogen. Unfortunately, the complexing agents which were effective with such compounds as the aluminum trialkyls were ineffective with the organometallic compounds comprising divalent metals. Consequently, where it was otherwise desirable to employ, for example, a diethyl zinc-water reaction product to catalyze a propylene oxide polymerization, the preferred procedure involved the addition of diethyl zinc and water separately to the propylene oxide whereby the diethyl zinc and water reacted in situ and the product catalyzed polymerization. This procedure has produced generally satisfactory rubber-grade polymers, but the desired control of consistency between batches has not been achieved.

One of the objects of this invention is to provide a stable catalyst for oxide polymerization. Another object is to provide a method of preparing such a catalyst incorporating therein an organometallic compound of a divalent metal. Another object of this invention is to provide a method of preparing a stable organometallic complex of a divalent metal, which complex forms a stable compound when mixed with cocatalysts containing active hydrogen. These objects as well as others which are apparent from the following description are satisfied by this invention.

With regard to the preparation of organometallic complexes this invention involves a method which comprises reacting (A) at least one compound of the formula $MR_2$ in which M can be zinc or cadmium and each R can be any monovalent hydrocarbon radical and (B) an organic compound free of active hydrogen and containing at least one tertiary nitrogen atom, an ethereal oxygen atom or a thioethereal sulfur atom.

Compounds A and B and their preparations are well known.

In compound A each R can be, for example, any alkyl radical such as the methyl, ethyl, isopropyl, tert-butyl, hexyl, 2-ethylhexyl, dodecyl, octadecyl or myricyl radical; any alkenyl radical such as the vinyl, allyl or octadienyl radicals; any cycloalkyl radical such as the cyclopentyl or cyclohexyl radical; any cycloalkenyl radical such as the cyclopentenyl, cyclohexenyl or cyclohexadienyl radical; any aryl radical such as the phenyl, naphthyl or xenyl radical; any alkaryl radical such as the tolyl or dimethylphenyl radical and any aralkyl radical such as the benzyl or xylyl radical. As a matter of commercial practicality it is desirable that each R contains no more than about 10 carbon atoms and is free of aliphatic unsaturation. It is preferable that each R is an alkyl radical.

From this definition of R compound A can be, for example, such organo-metallic compounds as dibutyl cadmium, diethyl cadmium, diisoamyl cadmium, diisobutyl cadmium, dimethyl cadmium, dipropyl cadmium, dihexyl cadmium, diheptyl cadmium, dioctadecyl cadmium, dilauryl cadmium, methyl cyclohexenyl cadmium, methyl alpha-naphthyl cadmium, ethyl phenyl cadmium, ethyl benzyl cadmium, ethyl propyl cadmium, methyl phenylcyclobutylene cadmium, methyl cyclohexylphenylene cadmium, tolyl methyl cadmium, dimethyl zinc, diethyl zinc, dibutyl zinc, diisobutyl zinc, di-n-propyl zinc, ethyl o-tolyl zinc, diisopropyl zinc, ethyl p-tolyl zinc, dibenzyl zinc, methyl ethyl zinc, dicyclohexyl zinc, methyl phenyl zinc, methyl naphthyl zinc, diheptyl zinc, didodecyl zinc, dioctadecyl zinc, ethyl vinyl zinc, diphenylbutylene zinc, butyl methyl zinc, ethyl cyclohexylbenzylene zinc and dicyclopentyl zinc.

Compound B can be any organic compound which is free of active hydrogen and which contains at least one tertiary nitrogen ethereal oxygen or thioethereal sulfur atom.

The nitrogen compounds can include, for example, triethylamine, trifurfurylamine, isopyrrole, isoimidazole, pyridine, pyrazine, pyridazine, pyrimidine, triazine, acridine, N,N-diethylaniline, o-phenanthroline, 4,4'-bipyridine, 2,2' - bipyridine, N,N - dimethylnaphthylamine, picoline, 1 - dodecylpiperidine, 1 - methylpiperdine, N-methylpyrrole, 1 - methylpyrrolidine, quinazoline, quinoline, quinoxaline and N,N - dimethyl - o - toluidine.

The ethereal oxygen compounds can include, for example, furan, pyran, oxepin, benzofuran, allyl ether, anethole, methoxybenzene, m-vinylanisole, sec-butyl ether, dioxane, allyl ethyl ether, ethyl 2-furylmethyl ether, ethyl hexyl ether, ethyl vinyl ether, methyl o-tolyl ether, phenyl vinyl ether, benzyl methyl ether, tetrahydrofuran, diethoxymethane, 1,2 - dimethoxyethane, diethylene glycol dimethyl ether, 1,2 - epoxypropane,, 1,2 - epoxybutane, 3,4 - epoxybutene - 1, ethyl ether, and tetrahydropyran. The ethers can be monoethers or polyethers, e.g., diethers, triethers or tetraethers.

The thioethereal sulfur compounds can include, for example, dimethyl sulfide, thiophene, 1,2-dithiole, thiepin, thionaphthene, allyl sulfide, 2,2'-bithiophene, butyl sulfide, phenyl sulfide, ethyl methyl sulfide, vinyl sulfide and methyl phenyl sulfide.

Compound B can contain more than one of the named functions as in, for example, oxathiole, isoxazole, oxazole, thiazole, isothioazole, oxazine, oxathiazine, benzoxazole, anthranil and N-(β-ethoxyethyl)-morpholine.

It is preferable that compound B be a solvent at least for the organometallic compound to be complexed and preferably for all further compounds with which the reaction product of A and B is to be used. However, if compound B is a solid or is not otherwise compatible with the organometallic compound, an inert mutual solvent, generally a hydrocarbon such as benzene, toluene or heptane, can be employed. Especially preferred for compound B are the heterocyclic tertiary amino compounnds, the heterocyclic monoethers and the saturated aliphatic diethers.

Compounds A and B generally react readily at room temperature in a few minutes. The reaction is slowed by cooling and accelerated by heating, but heating is generally undesirable due to the unstable nature of compound A. The nature of the reaction is unknown and the specific products are unknown, but stable products are formed as evidenced by the fact that lengthy storage periods do not affect the activity of the compound in its use as a catalyst in alkylene oxide polymerization.

It is believed that the molar ratio of A and B should be such that for each molecule of A there is sufficient B to supply at least two atoms of the aforementioned class including tertiary nitrogen atoms, ethereal oxygen atoms and thioethereal sulfur atoms. It is preferable to use a large excess of any compound B which is a satisfactory solvent.

The method of this invention which comprises the reaction of A and B is useful in preparing intermediate organometallic complex compounds which are stable themselves and can be stored or can be mixed and thereby reacted with (C) a compound containing an active hydrogen atom. Thus, compound C can be a compound of the formula R'''ZH in which R''' can be a hydrogen atom or a monovalent hydrocarbon radical, preferably containing no more than about 9 carbon atoms, and Z can be an oxygen or sulfur atom. Examples of such compounds are $H_2O$, $H_2S$, alcohols such as methanol, ethanol, 2-ethylhexanol, cyclohexanol, benzyl alcohol and allyl alcohol, phenol, cresol, and mercaptans such as methanethiol, ethanethiol, heptanethiol, α-toluenethiol, 2-propene-1-thiol, thiophenol and thiocresol. Compound C can also include primary aromatic amines, amides, secondary amines composed of at least one nitrogen atom, from about 2 to about 14 carbon atoms per nitrogen atom and at least 6 total hydrogen atoms per nitrogen atom, any remaining atoms in the secondary amines being ethereal oxygen atoms, hydroxyl oxygen atoms and thioethereal sulfur atoms, any nitrogen atom having two aromatic rings attached thereto being part of a cyclic amino compound, and cycloalkadienes of from 5 to 6 carbon atoms, as fully described in the copending application Ser. No. 170,235, filed Jan. 31, 1962, by Marco A. Achon.

Since the complex reaction product of A and B is ultimately mixed with C, it is preferable that the solvent employed for the reaction of A and B be a mutual solvent for C also permitting the addition of C directly to the reaction system of A and B after allowing sufficient time for the reaction of A and B.

The complex reaction product of A and B reacts with compound C apparently to form a stable organometallic compound which is a satisfactory catalyst for alkylene oxide polymerization. The amount of C which is mixed with the complex reaction product is critical in its proportion to the amount of compound A. Generally, the molar ratio of C to A ranges from about 0.05 to about 1.5 with a preferred range from about 0.5 to about 1.0 for the amine, amide and cycloalkadiene compounds defined above and a preferred range from about 0.8 to about 1.5 for the other compounds suitable for use as compound C.

Compound C is preferably mixed with the complex reaction product of A and B at about room temperature or less. The lower temperature limit is the freezing point of the system at any time during the mixing.

The product of mixing A, B and C as described above is a stable organometallic compound which is a satisfactory catalyst for the polymerization of compound D, a polymerizable organic cyclic oxide having at least one ring of from 2 to 3 carbon atoms and one oxygen atom.

Compound D of the method of this invention can be any polymerizable organic cyclic oxide. Compound D can include any cyclic oxide having 1, 2, 3 or more oxygen-carbon rings in which one oxygen atom is joined with 2 or 3 carbon atoms in a ring which opens in the process of polymerization. These cyclic oxides can include 1, 2 or more, preferably only 1, aliphatic carbon-to-carbon double bond. The halogen, nitro, ether and ester substituted derivatives of these cyclic oxides can likewise be employed. Thus, there can be used epoxides, di-epoxides, oxetanes, similar unsaturated cyclic oxides, their aliphatic, cycloaliphatic or aromatic substituted derivatives on the ring such as the alkyl, cycloalkyl and aryl substituted derivatives, and their ester, halogen, ether and nitro substituted derivatives.

More specifically, compound D can include, for example, oxirene, ethylene oxide, nitro epoxy ethane, propylene oxide, 2,3-epoxy butane, 1,2-epoxy butane, 1,2-epoxy dodecane, butadiene dioxide, isobutylene oxide, butadiene monoxide, 3-allyloxy-3-methyl oxetane, 3-vinyl-3-methyl oxetane, styrene oxide, methyl glycidyl ether, ethyl glycidyl ether, allyl glycidyl ether, alpha-methyl styrene oxide, vinyl cyclohexene monoxide, diallyl monoxide, vinyl cyclohexene dioxide, 1,2-diisobutylene oxide, the diglycidyl ether of pentanediol, 2,3-diisobutylene oxide, phenyl glycidyl ether, p-chlorophenyl glycidyl ether, glycidyl methacrylate, oxetane ($C_3H_6O$), 3,3-diethyl oxetane, 2-methylene-1,3-epoxy propane (3-methylene oxetane), 3-vinyl-3-methyl oxetane, 3-allyl-oxy-3-methyl oxetane, 3-vinyl-3-methyl oxetane, 3-allyloxy-oxetane, 3-ethyl-3-butyl oxetane, 3,3-dimethyl oxetane, 3,3-di(chloromethyl) oxetane, 3-methyl-3-chloromethyl oxetane, 3-methyl-3-ethyl oxetane, the diglycidyl ether of pentanediol, the diglycidyl ether of bisphenol A, 1-epoxyethyl-3,4-epoxy cyclohexane, dicyclopentadiene monoxide, 1,2-hexacontene oxide, 1,2-heptacontene oxide, butene monoxide, dodecene monoxide, isoprene monoxide and other similar materials having 1 to 4 or more epoxy or oxetane groups and up to 70 carbon atoms and the like. Mixtures of these cyclic oxides can be used if desired. Of these oxides it is preferable to use the lower molecular weight saturated cyclic oxides such as ethylene oxide, propylene oxide and butylene oxide with minor amounts of unsaturated cyclic oxides such as allyl glycidyl ether, butadiene monoxide and vinyl cyclohexene monoxide.

Preferred cyclic oxide mixtures for copolymerization are those containing a total of from about 0.5 to about 30 mol percent of one or more unsaturated cyclic oxides with the balance being saturated cyclic oxides. Where the monomers tend to go into the copolymer at different rates, polymerization can be conducted in a manner to provide for the desired copolymer.

The use of from about 0.5 to 20 mol percent of an unsaturated cyclic oxide provides curable and rubbery copolymer stocks which can be used either alone or in a mixture with other rubbers (natural, butadiene-styrene, polybutadiene, polyisoprene, nitrile and similar unsaturated copolymers) to produce tire treads, tire carcasses, hose, shoe soles or belt stocks. In order to obtain desirable curable characteristics coupled with the optimum stability of the stock as measured by accelerated oxygen aging tests at elevated temperatures, it is more preferable to use from about 1.5 to 10 mol percent of one or more of the unsaturated cyclic oxides with the balance being one or more of the saturated cyclic oxides.

Where a cyclic oxide employed as compound D is a monomer containing 2 or more epoxide, oxetane and similar groups, it may readily crosslink or gel in contact with the product of A, B and C to form a thermoset rather than a thermoplastic material. Such materials are very useful in forming potting compounds for delicate electrical and mechanical instruments.

The product of A, B and C acts as a catalyst for the polymerization of compound D. The total amount of this catalyst employed usually varies with the temperature. At higher temperatures, e.g., 80° C., 100° C. or higher, less catalyst is required than at lower temperatures. It is generally preferred to operate in the temperature range of about 40° C. to about 100° C. since high temperatures tend to cause undesirable side reactions while very low temperatures require long periods of time to get satisfactory yields although molecular weights of polymers produced at low temperatures are generally higher than molecular weights of polymers produced at high temperatures. There is generally used from about 0.01 to 10 mols of A and C together per 100 mols of D or, stated conversely, from about 10 to about 10,000 mols of D per mol of A and C together. More than about 10 mols of A and C per 100 mols of D is wasteful and can be deleterious. It is preferable to employ about 0.2 to about 5 total mols of A and C per 100 mols of D.

Polymerization can be accomplished in mass (sometimes referred to as "in bulk") or in solvent. It is to be understood that when polymerizing in mass some of the monomeric compound D can act as a solvent for the polymer as it is being formed, and the formed polymer while in a liquid state can also act as a solvent. Examples of solvents which can be used include toluene, benzene, hexane, heptane, octane, xylene, cyclohexane, ethyl ether, methylene chloride, chloroform, carbon tetrachloride, dioxane and trichloroethylene. Inert or relatively inert non-polar solvents are preferred. When solvents are employed, there should be a sufficient amount in which both compound D and the polymeric product can be dispersed.

Polymerization can be conducted under pressure and should be conducted under a non-oxidizing atmosphere. The non-oxidizing atmosphere can be solvent vapor including the vapor of monomer compound D, but it is preferably an inert gas such as nitrogen, helium, argon or neon or mixtures thereof. Pressures can vary from atmospheric up to 150 atmospheres although they generally are in the range of 1 to 25 atmospheres. Polymerization times vary depending primarily on the temperature, the content of compounds A, B, C and D and their molar relationship and the presence of inert solvent. Polymerization can be conducted in the dark to avoid gelation or in contact with suitable free radical inhibitors such as, for example, nitrobenzene, dinitrotoluene, dinitrodiphenyl, nitro diphenyl amine or chlorodinitrobenzene. Antioxidants such as phenyl-beta-naphthylamine, diphenyl amine, and the like are also desirably added prior to, during or after polymerization.

Many of the polymers obtained by the method of the present invention have a high average molecular weight, i.e., from about 20,000 to 500,000 or higher, as shown by their high viscosities. They may be crystalline and/or amorphous. These polymers are useful as coating for fabrics, films for packaging materials, elastic fibers, adhesives, and in making tires, shoe heels, raincoats, and upholstery materials, floor mats, molded articles and the like. Liquid polymers of this invention are useful as plasticizers for natural and synthetic resins and rubbers.

The polymers may be compounded with the usual rubber and resin compounding materials, such as curing agents, antidegradants, fillers, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2-mercaptobenzothiazole, bis-morpholyl) disulfide, bis(benzothiazyl)disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl-beta-naphthylamine, pine oil, mineral oil, hydroquinone monobenzyl ether, mixtures of octylated diphenylamines, styrenated phenols, aldol, alpha-naphthylamine, diphenyl amine acetone reaction products, antimony oxide, asphalt, coumarone-indene resin, natural rubber, polyisoprene, butadiene-styrene rubber or resin, nitrile rubber, acrylonitrile-styrene resin, polyester and/or ether urethanes, polyvinyl chloride and the like and mixtures thereof.

The following examples are merely illustrative and are not intended to limit this invention the scope of which is properly delineated in the claims. Inherent and intrinsic viscosities were determined using concentrations of from 0.1 to 0.4 grams of polymer per 100 milliliters of isopropanol at 60° C.

*Example I*

Pure 2,2'-bipyridine was dissolved in heptane in a closed nitrogen flushed system. Diethyl zinc was added dropwise to the solution in a ratio of one mol of diethyl zinc per mol of 2,2'-bipyridine. The system containing a 2,2'-bipyridine-diethyl zinc complex was then cooled to 4°–5° C. after which 0.8 mol of water per mol of zinc was added. The desired reaction product precipitated, was separated by decantation and was vacuum dried.

The stable dry product was then mixed with propylene oxide in an amount equal to 0.4% by weight of product based on the weight of propylene oxide. The reaction mixture was heated for 118 hours at 80° C. converting 41% of the propylene oxide to a rubbery polymeric material having an inherent viscosity of 0.491 dl./g. and 2 percent by weight crystallinity.

*Example II*

Pure o-phenanthroline was dissolved in heptane in a closed nitrogen-flushed system. Diethyl zinc was added dropwise to the solution in a ratio of one mol of diethyl zinc per mol of o-phenanthroline. The system containing an o-phenanthrolinediethyl zinc complex was then cooled to 4°–5° C. after which 0.8 mol of water per mol of zinc was added. The desired product precipitated, was separated by decantation and was vacuum dried.

The stable dry product was then mixed with propylene oxide in an amount equal to 0.47% by weight of product based on the weight of propylene oxide. The reaction mixture was heated for 64 hours at 80° C. converting 21.7% of the propylene oxide to a rubbery polymeric material having an inherent viscosity of 0.893 dl./g. and 7 percent by weight crystallinity.

*Example III*

Fifty milliliters of dry, oxygen-free pyridine were charged to a nitrogen-flushed container which was subsequently closed. The system was cooled to −6° C., and 0.051 mol of diethyl zinc was added dropwise. When the system had cooled again to −6° C., 0.035 mol of water was added over a period of 2 to 3 hours. At the end of the reaction the resulting solution was dried at about 85° C. at an absolute pressure of from 0.5 to 1.0 mm. Hg.

This stable dry catalyst was mixed into propylene oxide in an amount equal to 0.49% by weight based on the weight of the propylene oxide. After the system was heated for 72 hours at 80° C., 91.8% of the propylene oxide was converted to a rubbery polymeric material having an inherent viscosity of 0.875 dl./g.

*Example IV*

Diethyl zinc was added slowly to a large molar excess of dry, oxygen-free triethylamine at −6°. After the system had been cooled again to −6° C., water was added slowly in an amount equal to about 0.8 mol of water per mol of zinc. The resulting solution was stripped at 0.5–1.0 mm. Hg at room temperature of excess triethylamine, and the dry catalyst was stored in a closed container.

This stable dry catalyst was mixed into propylene oxide in an amount equal to 0.3% by weight based on the weight of the propylene oxide. The mixture was heated 40 hours at 80° C. converting 64.2% of the propylene oxide into a rubbery polymeric material having an inherent viscosity of 1.52 dl./g.

Example V

In each of the following experiments 0.143 g.-mol of diethyl zinc was dissolved in one-half the amount of solvent to be used in a brown, capped, $N_2$-flushed bottle chilled to the desired reaction temperature. The water (0.079 g.-mol) was then dissolved in the remaining solvent and added at room temperature to the chilled diethyl zinc solution at a rate of one drop per second. After the addition of the water the reaction was allowed to continue until the evolution of gas was practically nil indicating essential completion of the reaction. Each catalyst solution was then stored in the dark at its preparation temperature for the time shown. Each catalyst after aging was added to propylene oxide in an amount equal to 0.00165 mol of catalyst per mol of propylene oxide. The systems were heated at 80° C. producing in each case a rubbery polymeric material with the percent monomer conversion shown.

The catalyst solutions mentioned in the examples were stored in the dark at the temperature of preparation. The examples cited were run in the bulk, no heptane used.

TABLE I

| Run | Catalyst Preparation | | | Polymerization at 80° C. | | | |
|---|---|---|---|---|---|---|---|
| | Temp. (° C.) of Catalyst Preparation and Storage | Complexing Agent and Solvent | Amount Solvent (g.) | Hrs. Catalysts Aged | Time (hrs.) | Percent Conversion | Intr. Visc. (dl./g.) |
| A | 24-35 | $CH_2CH_2CH_2CH_2O$ | 62.16 | 120 | 2.5 | 70 | 5.28 |
| B | -20 | $CH_2CH_2CH_2CH_2O$ | 62.16 | 96 | 6 | 93.2 | 2.40 |
| C | 3-5 | $(CH_3OCH_2-)_2$ | 60.4 | 168 | 6 | 71.2 | 2.84 |
| D | -20 | $(CH_3OCH_2-)_2$ | 60.4 | 168 | 6 | 79.6 | 3.03 |

Example VI

Diethyl zinc (0.0372 g.-mol) was dissolved in 24.9 grams of propylene oxide used as solvent in a brown, capped, $N_2$-flushed bottle chilled to −22° C. Water (0.0297 g.-mol) dissolved in 24 grams of propylene oxide was added at room temperature to the chilled diethyl zinc solution at a rate of one drop per second. After the addition of the water the reaction was allowed to continue until the evolution of gas was practically nil indicating essential completion of the reaction. The catalyst solution was then stored in the dark at −20° C. for one hour.

Separate portions of this stable catalyst solution were added to batches of propylene oxide in mol ratios of 0.002 and 0.001 mol respectively of catalyst per mol of propylene oxide. The first mixture was heated 17 hours at 80° C. to convert all of the propylene oxide to a rubbery polymeric material. The second mixture was heated 5 hours at 80° C. to convert all the propylene oxide to a rubbery polymeric material having an intrinsic viscosity of 2.00 dl./g.

Example VII

When di-isobutyl zinc and diethyl cadmium are each substituted mol per mol for the diethyl zinc in the catalyst preparation described in Example III, a stable product is produced in each case which converts propylene oxide to a rubbery polymeric material after 72 hours at 80° C. when mixed with the propylene oxide in an amount equal to 1% by weight of the propylene oxide.

Example VIII

When each of the following compounds is substituted mol per mol for the triethylamine in the catalyst preparation described in Example IV, a stable product is produced which converts propylene oxide to a rubbery polymeric material after 72 hours at 80° C. when mixed with propylene oxide in an amount equal to 1% by weight of the propylene oxide.

diethylene glycol dimethyl ether
1,2-dithiole
thiepin
butyl sulfide
1,3-oxathiole
1,4-oxazine
thiazole
1,2,5-oxathiazine

Example IX

When 1,2-epoxybutane is substituted mol per mol for the propylene oxide in the catalyst preparation described in Example VI, a stable product is produced which when substituted for the catalyst solution produced in Example VI produces rubbery copolymers of propylene oxide and 1,2-epoxybutane.

Example X

When each of the following compounds is substituted mol per mol for the water employed in Example VI, a stable product is produced which when substituted for the catalyst solution produced in Example VI produces a rubbery polymer of propylene oxide.

hydrogen sulfide as a 1 mol percent solution in heptane
isopropanol
butanethiol
phenothiazine
meta-aminophenol
pyrrolidine
piperidine
morpholine
cyclopentadiene
formamide
aniline
urea

Example XI

Polymers are produced when the catalyst solutions prepared in Example V are added to the following compounds in an amount equal to 0.00165 mol of catalyst per mol of epoxide.

A mixture of 75 mol percent propylene oxide, 24 mol percent ethylene oxide and 1 mol percent of butadiene monoxide.

A mixture of 97 mol percent propylene oxide and 3 mol percent allyl glycidyl ether.

What we claim is:

1. The method which comprises (1) reacting (A) at least one compound of the formula $MR_2$ in which M is selected from the group consisting of zinc and cadmium and each R is a monovalent hydrocarbon radical with (B) an organic compound free of active hydrogen and containing at least one atom selected from the group consisting of tertiary nitrogen atoms, ethereal oxygen atoms and thioethereal sulfur atoms to form a complex and (2) reacting the complex reaction product of A and B with (C) a compound of the formula $R'''ZH$ in which $R'''$ is a substituent selected from the group consisting of monovalent hydrocarbon radicals and the hydrogen atom and Z is a substituent selected from the group consisting of the oxygen atom and the sulfur atom where the molar ratio of A to B is such that for each molecule of A there is a sufficient amount of B to supply at least two atoms of the aforementioned class of tertiary nitrogen atoms, ethereal oxygen atoms and thioethereal sulfur atoms and where the molar ratio of C to A is from about 0.05 to about 1.5, to form a stable second reaction product useful as a catalyst for the polymerization of epoxides.

2. The method of claim 1 wherein A is $ZnR'_2$ in which each R' is a monovalent hydrocarbon radical of from 1 to about 10 carbon atoms and free of aliphatic unsaturation, B is an organic tertiary amine free of active hydrogen and C is water.

3. The method of claim 1 wherein A is $ZnR''_2$ in which each R'' is an alkyl radical of from 1 to about 10 carbon atoms, B is a heterocyclic tertiary amino compound free of active hydrogen and C is water.

4. The method of claim 1 wherein A is $ZnR'_2$ in which each R' is a monovalent hydrocarbon radical of from 1 to about 10 carbon atoms and free of aliphatic unsaturation, B is an ether free of active hydrogen and C is water.

5. The method of claim 1 wherein A is $ZnR''_2$ in which each R'' is an alkyl radical of from 1 to about 10 carbon atoms, B is a heterocyclic monoether of from 4 to 5 carbon atoms and free of active hydrogen and C is water.

6. The method of claim 1 wherein A is $ZnR''_2$ in which each R'' is an alkyl radical of from 1 to about 10 carbon atoms, B is a saturated aliphatic polyether free of active hydrogen and C is water.

7. The reaction product useful as a catalyst for the polymerization of epoxides of the complex reaction product of (A) at least one compound of the formula $MR_2$ in which M is selected from the group consisting of zinc and cadmium and each R is a monovalent hydrocarbon radical and (B) an organic compound free of active hydrogen and containing at least one atom selected from the group consisting of tertiary nitrogen atoms, ethereal oxygen atoms and thioethereal sulfur atoms with (C) a compound of the formula R'''ZH in which R''' is a substituent selected from the group consisting of monovalent hydrocarbon radicals and the hydrogen atom and Z is a substituent selected from the group consisting of the oxygen atom and the sulfur atom, where the molar ratio of A to B is such that for each molecule of A there is a sufficient amount of B to supply at least two atoms of the aforementioned class of tertiary nitrogen atoms, ethereal oxygen atoms and thioethereal sulfur atoms and where the molar ratio of C to A is from about 0.05 to about 1.5.

8. The method for making a polyether which comprises polymerizing (D) a polymerizable organic cyclic oxide having a ring of from two to three carbon atoms and one oxygen atom in contact with, as a catalyst for the polymerization of said oxide, the reaction product of the complex reaction product of (A) at least one compound of the formula $MR_2$ in which M is selected from the group consisting of zinc and cadmium and each R is a monovalent hydrocarbon radical, and (B) an organic compound free of active hydrogen and containing at least one atom selected from the group consisting of tertiary nitrogen atoms, ethereal oxygen atoms and thioethereal sulfur atoms with (C) a compound of the formula R'''ZH in which R''' is a substituent selected from the group consisting of monovalent hydrocarbon radicals and the hydrogen atom and Z is a substituent selected from the group consisting of the oxygen atom and the sulfur atom, where the molar ratio of A to B is such that for each molecule of A there is a sufficient amount of B to supply at least two atoms of the aforementioned class of tertiary nitrogen atoms, ethereal oxygen atoms, and thioethereal sulfur atoms, where the molar ratio of C to A is from about 0.05 to about 1.5, and where the ratio of D to A and C is from about 10 to 10,000 mols of D per mol of A and C together.

References Cited by the Examiner

UNITED STATES PATENTS 2,989,557  6/1961  Blitzer et al. _____ 260—429.9

FOREIGN PATENTS 809,717  3/1959  Great Britain.

OTHER REFERENCES

Coates: Organo-Metallic Compounds, Published by John Wiley and Sons, Inc., New York (1956) pp. 38–9.

Rochow et al.: The Chemistry of Organometallic Compounds, Published by John Wiley and Sons, Inc., New York (1957) pp. 104–105.

Furukawa et al.: Makromal Chem. 32, 90–92 (1959).

JOSEPH L. SCHOFER, *Primary Examiner.*

WILLIAM H. SHORT, H. WONG, JR., W. G. GOODSON, J. F. McNALLY, *Assistant Examiners.*